United States Patent

Martin

[15] 3,677,303

[45] July 18, 1972

[54] PREFABRICATED CONDUIT

[72] Inventor: Joseph L. Martin, Windsor, England

[73] Assignee: Anvil Industries, Inc., Brecksville, Ohio

[22] Filed: April 14, 1969

[21] Appl. No.: 826,751

Related U.S. Application Data

[63] Continuation-in-part of Ser. No. 541,233, April 8, 1966.

[52] U.S. Cl.................................138/109, 138/149, 138/113
[51] Int. Cl...........................................................F16l 9/14
[58] Field of Search.........................138/113, 153, 149, 109

[56] References Cited

UNITED STATES PATENTS

| | | | |
|---|---|---|---|
| 2,347,855 | 5/1944 | Varga | 138/151 X |
| 2,551,710 | 5/1951 | Slaughter | 138/113 X |
| 3,250,297 | 5/1966 | Mooneyham | 138/113 |
| 3,307,590 | 3/1967 | Carlson | 138/113 X |
| 1,976,589 | 10/1934 | Trickey | 138/153 X |
| 2,664,112 | 12/1953 | Isenberg | 138/113 |
| 2,857,931 | 10/1958 | Lawton | 138/149 X |
| 2,894,538 | 7/1959 | Wilson | 138/149 X |
| 3,126,918 | 3/1964 | Eaton | 138/113 |
| 3,314,449 | 4/1967 | Krone et al. | 138/153 X |

Primary Examiner—Carlton R. Croyle
Assistant Examiner—Richard J. Sher
Attorney—Watts, Hoffmann, Fisher & Heinke

[57] ABSTRACT

A conduit comprising a fluid conducting pipe supported within a casing, the casing being formed by a pair of coaxial, radially spaced plastic tubes and including corrugated structure and an insulating material in the space between the tubes. In one embodiment the pipe is supported within the casing in spaced relation to its inner surface by pipe supports disposed along the pipe to provide an insulating air space around the pipe, and in another embodiment the casing is filled with a foamed resin around the pipe. Sections of the conduit may be connected together by a tubular sheath surrounding and extending between the ends of adjacent casing sections and structure including O-rings mounted between the ends of the sheath and the casing sections.

2 Claims, 5 Drawing Figures

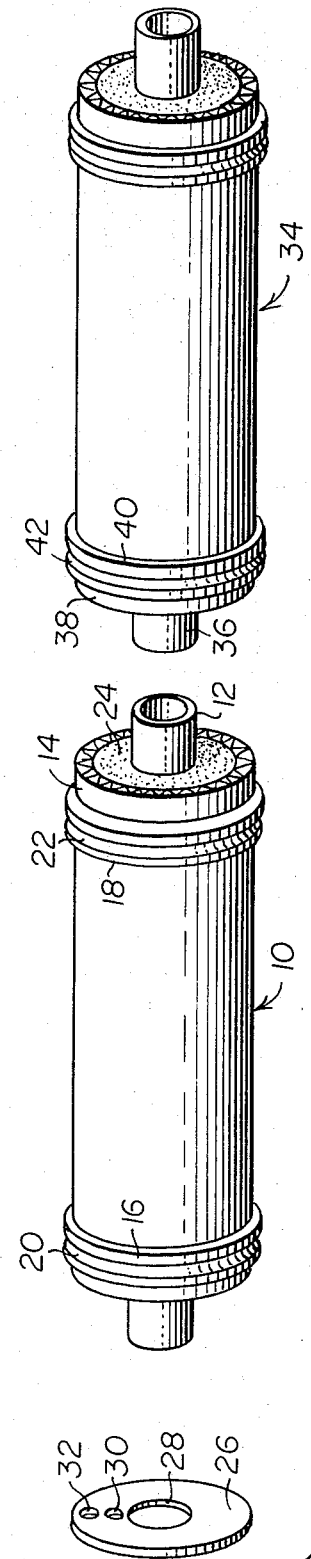
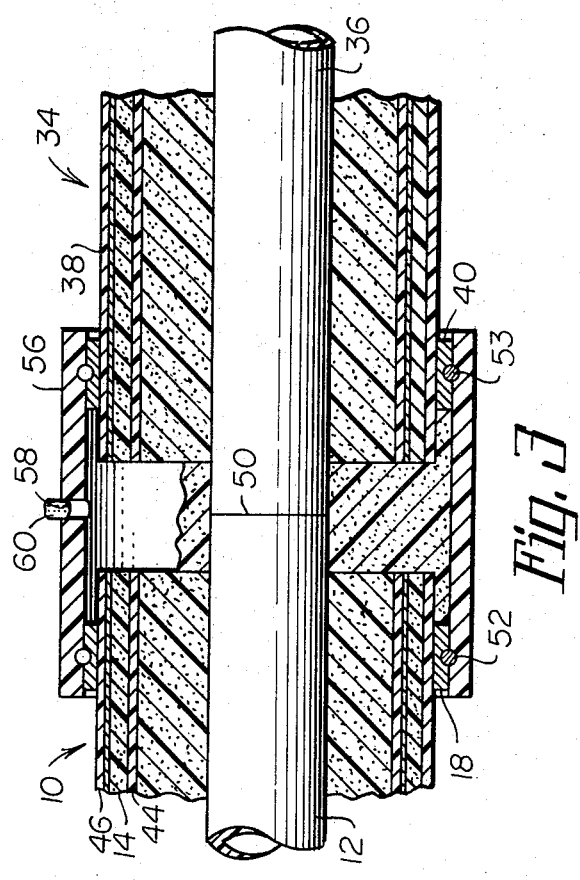
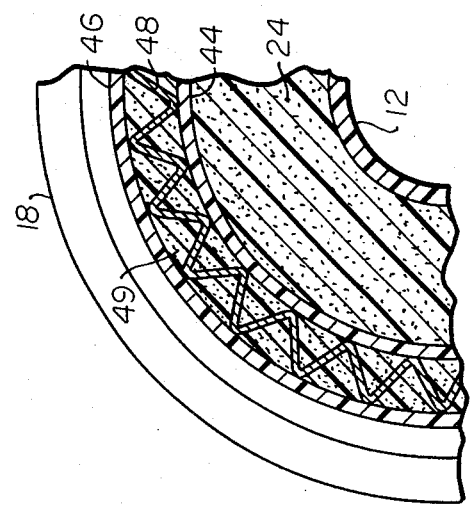
INVENTOR.
JOSEPH L. MARTIN
BY Watts & Fisher, Attys.

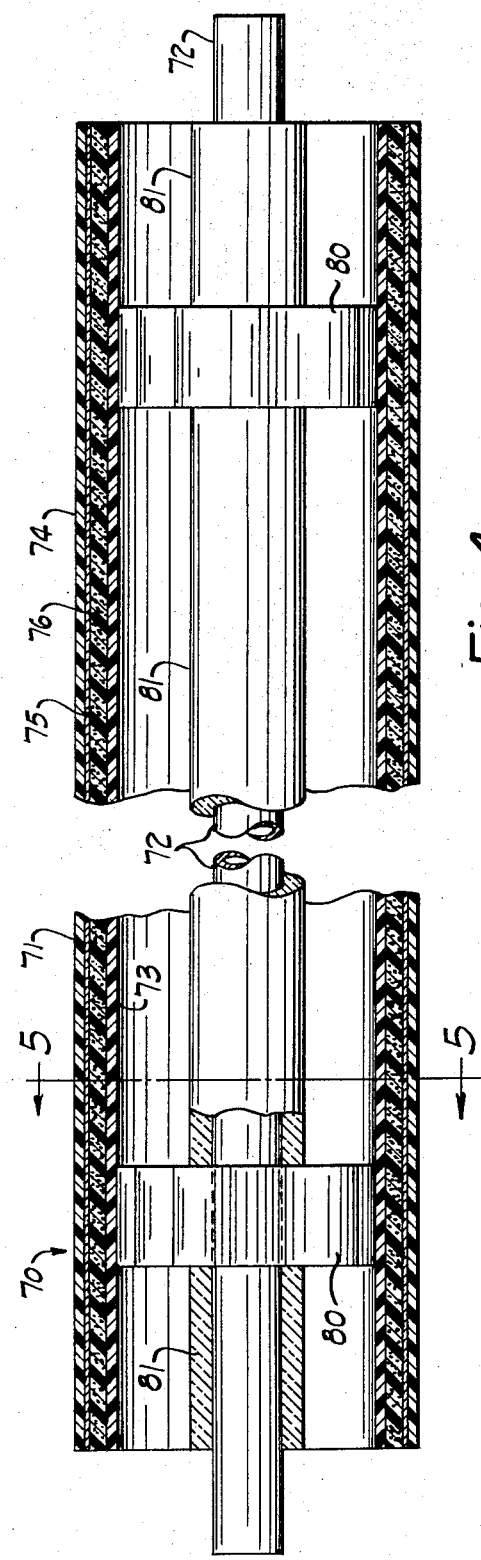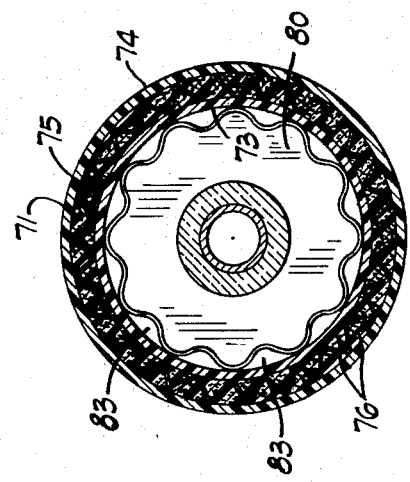

PREFABRICATED CONDUIT

CROSS-REFERENCE TO RELATED APPLICATION

This application is a continuation-in-part of application Ser. No. 541,233 of Joseph L. Martin, filed Apr. 8, 1966 and entitled Prefabricated Conduit System and Method of Construction and Installation.

BACKGROUND OF THE INVENTION

This invention relates generally to conduit systems, and more particularly to the construction of prefabricated conduits of the type including a fluid conducting pipe extending within an outer casing.

Conduits are widely used to carry gas, water, chemicals, municipal services, or steam for heating and may be used underground or above the surface of the ground. These conduits may consist of sections that are prefabricated at the factory and later connected at the site of installation, such as in a central underground or overhead heating system. Typically, each prefabricated section includes an outer casing and an inner fluid-conducting pipe which may be longer than the surrounding outer casing. An insulating or protective material may be provided within the casing around the inner pipe and the outer casing. The ends of the pipe projecting from adjacent casings are connected together at the site of installation and insulation may be provided around the joints. The casing sections are then connected together in a suitable manner to complete the installation. In one known prefabricated system, the casing sections are connected by a tubular sheath having an inner diameter that is larger than the diameter of the casings. This sheath or coupling is telescoped over the ends of the two adjacent sections of casing so as to overlap and seal the welded pipe joint.

It is desirable that the prefabricated conduit sections be strong to resist damage, such as ruptures of the outer casing and the like. At the same time, the conduit sections should be corrosion resistant and should be light in weight in order to facilitate handling and assembly in the field. When a tubular sheath is used to seal and connect the sections of casing to form a conduit system, the sheaths should be easily positioned.

SUMMARY OF THE INVENTION

This invention provides a strong, light-weight, corrosion resistant casing for use in conduits of the type described above. More particularly, the invention provides a casing construction comprised of a pair of coaxial, radially spaced, plastic tubes and strengthening and insulating structure in the annular space between the tubes. The preferred strengthening and insulating structure of the casing includes a corrugated structure between the tubes and an insulating material, preferably a foamed resin, filling the spaces between the corrugated structure and the tubes.

According to one preferred embodiment of the invention, a fluid conducting pipe is supported within the casing in spaced relation to its inner surface so as to provide an insulating air space around the pipe. In this embodiment the pipe is supported by spaced pipe supports disposed along the length of the pipe within the casing. According to another preferred embodiment of the invention, the ends of the pipe protruding from both ends of the casing are temporarily supported by cardboard disks having central apertures which fit around the pipe, and a foamed resin is supplied to the space between the casing and the pipe and allowed to harden to provide strength and insulation.

Sections of conduit may be connected together in end-to-end relation by structure including a plastic collar or mounting band secured around each end of the casing sections. A rubber O-ring is positioned in an annular groove in each mounting band. After the prefabricated sections of the conduit have been properly positioned in the field and after the ends of the pipe have been connected together, a plastic or metal tubular sealing sheath is positioned over the joint between two sections of the casing so as to overlap both sections and seal the pipe joint. The sealing sheath has an inner diameter slightly larger than the outer diameter of the mounting bands and is engaged with the O-rings carried by the bands. In the embodiment of the invention in which a foamed resin fills the space between the casing and the pipe, a similar foamed resin may be injected through the sheath into the space around the connected ends of the pipes.

Accordingly, it is an object of this invention to provide a new, prefabricated conduit construction.

Another object of this invention is to provide a new casing construction which is strong, light in weight and corrosion resistant.

A further object of this invention is to provide a new and improved manner of connecting sections of prefabricated conduit sections together in end-to-end relation.

Other objects, advantages and a fuller understanding of the invention will be had from the following detailed description when taken in conjunction with the accompanying drawings.

BRIEF DESCRIPTION OF THE DRAWINGS

FIG. 1 is a perspective view showing two prefabricated conduit sections constructed according to one embodiment of the invention and one of the temporary closure disks provided at the ends of the conduit sections;

FIG. 2 is a fragmentary, cross-sectional view of one of the conduit sections shown in FIG. 1;

FIG. 3 is a fragmentary, vertical cross-sectional view of the joint formed between the two prefabricated conduit sections of FIG. 1;

FIG. 4 is a cross-sectional view of a second preferred embodiment of the invention showing the pipe supported in spaced relation to the inner surface of the new and improved casing to provide an insulating air space around the pipe; and FIG. 5 is a cross-sectional view taken on the line 5—5 of FIG. 4.

DESCRIPTION OF THE PREFERRED EMBODIMENTS

Referring now to the drawings, and to the embodiment of the invention shown in FIGS. 1–3, a first prefabricated section of the conduit is generally designated by reference numeral 10. The conduit section 10 includes an inner fluid-conducting pipe 12 which may be made of metal, plastic, asbestos cement or other suitable material, and an outer tubular casing 14. The inner pipe 12 has a smaller diameter and a greater length than the outer casing 14 and is positioned so that its ends extend a short distance beyond each of the ends of the casing. If desired, one or more additional pipes may extend through the casing, as is conventional to provide return lines and the like.

In accordance with the embodiment of the invention shown in FIGS. 1–3, plastic mounting bands 16, 18 are mounted around the conduit casing 14 near its ends. Each of the mounting bands 16, 18 has a circumferential annular groove 20. The annular grooves 20 are formed to receive O-rings concentric with the casing 14. The mounting bands 16, 18 are preferably made of a suitable plastic material, such as polyvinyl chloride or the like and are welded or otherwise secured to the outer surface of the casing 14 which is also plastic. The space between the outer surface of the pipe 12 and the inner surface of the casing 14 is filled with a foamed resin 24, such as polyurethane or the like.

Disks of cardboard or other material are used temporarily to aid in the fabrication of the conduit section 10 and to seal the ends of the section during shipment. One such disk is designated by reference numeral 26 and includes a central aperture 28 and two smaller apertures 30, 32. The outer diameter of the cardboard disk 26 may be nearly equal to the inner diameter of the casing 14, and the diameter of the aperture 28 is equal to the outer diameter of the pipe 12 so that the disk 26 may be fitted into the end of the casing to close the space between the pipe and the casing. A similar cardboard disk (not shown) is mounted in the other end of the conduit section 10 to support the other end of the pipe 12 and to seal the other end of the conduit space between the pipe and casing.

Only one of the two cardboard disks associated with the conduit section 10 includes the apertures 30, 32. When the two cardboard disks are in place, the foamed resin is supplied through the aperture 30 by any of the conventional techniques and apparatus to fill the space between the pipe and the casing. After the resin 24 has set, it serves to support the pipe or pipes in the casing and to insulate the pipe from the casing.

Referring now to FIG. 2, the preferred construction of the casing 14 is shown to comprise coaxial, radially spaced, inner and outer plastic tubes 44, 46, respectively. A corrugated structure 48 is disposed between the tubes 44, 46 and extends substantially the length of the tubes. The corrugated structure 48 may be in the form of a sleeve or a web which is extruded integrally with the tubes 44, 46. The spaces between the tubes and the corrugated structure 48 are filled with an insulating material which is preferably a foamed resin 49, such as polyurethane or the like. The foamed resin may be supplied through the aperture 32 in the disk 26. Alternatively, the spaces between the tubes 44, 46 and the corrugated structure 48 may be filled with a material such as a cement, although a foamed resin is preferred because it has been found to offer superior insulating characteristics in the described conduit system. If desired, the corrugated structure 48 may be provided with apertures (not shown) along its length to aid in filling the spaces between the structure 48 and the tubes 44, 46.

A second prefabricated conduit section 34 is constructed in a manner identical to that of section 10 and has an inner pipe 36, an outer casing 38 and mounting bands 40 provided with annular grooves 42. It will be understood that the conduit sections 10, 34 are prefabricated in the factory and are shipped to the field for assembly into a continuous conduit system. The disks at each end of the prefabricated sections may be left in place during shipment to protect the foamed insulation and supporting material 24, 49.

A preferred manner of connecting the adjacent conduit sections 10, 34 is best explained with reference to FIG. 3. As thereshown, O-rings 52, 53 are placed in the band grooves 20, 42, respectively. A tubular sealing sheath 56 which may be made of plastic, metal or other material is placed around one of the sections 10 or 34 so that the adjacent ends of the pipes 12, 36 are exposed. The ends of the pipes 12, 36 are then brought together and connected at 50 to form a continuous fluid flow path. When the joint 50 has been formed, the sheath 56 is moved endwise to bridge the space between the conduit casings 14, 38. The O-rings 52, 53 form a tight peripheral seal between the bands 18, 40 and the inner surface of the sheath 56.

As shown in FIG. 3, the tubular sheath or coupling 56 has an aperture 58 which may be closed by a plug 60. In order to insulate the space within the sheath 56 around the joint 50, the plug 60 is removed and a foamed resin, such as polyurethane or the like, is poured into the space between the sealing sheath 56 and the pipes 12, 36. After the foamed resin has set, the plug 60 is replaced. This forms a sealed joint which is both insulated and protected from leakage.

The structure including the sealing sheath 56 mounted on the O-rings 20, 42 provides a convenient manner of connecting the conduit sections 10, 34. Since the O-rings are mounted on plastic bands that are welded to the casing sections, the inner diameter of the sheath is slightly larger than the outer diameter of the casings. The sheath contacts only the O-rings and the surface of the mounting bands. This reduced contact area enables the sheath to slide easily back onto one of the conduits so as to be out of the way when the pipes of the two sections are connected together. Similarly, the sheath can be easily positioned over the joint after it has been completed. The polyurethane or other foam which is then poured into place over the joint provides a superior seal and helps to hold the sealing sheath in place.

Reference is now made to the second preferred embodiment of the invention shown in FIGS. 4 and 5. The illustrated conduit section 70 is comprised of an outer casing 71 and an inner fluid-conducting pipe 72 which extends through the casing and projects beyond its ends.

The casing 71 is identical in construction to the casing 14 described above in connection with the embodiment of FIGS. 1–3. The casing 71 is formed by coaxial, radially spaced, inner and outer plastic tubes 73, 74, respectively, and strengthening and insulating structure between the tubes. The strengthening and insulating structure is comprised of a corrugated structure 75 which is shown as extending the length of the tubes 73, 74. As in the embodiment of FIGS. 1–3, the corrugated structure 48 may be a sleeve or it may be a web formed integrally with the tubes 73, 74. The spaces between the corrugated structure 75 and the tubes 73, 74 are filled with an insulating material, preferably a foamed resin 76, such as polyurethane or the like.

In this embodiment of the invention, the pipe 72 is supported within the casing 71 in spaced relation to its inner surface by a plurality of pipe supports 80 which are disposed along the length of the pipe. The supports 80 engage the inner surface of the tube 73 and have central openings through which the pipe 72 extends. The portions of the pipe 72 between adjacent supports 80 are preferably covered by sleeves 81 of suitable insulating material, such as fiberglass or the like.

The pipe 72, including the surrounding sleeves 81 of insulation material, are supported by the members 80 within the casing 71 so as to provide an insulating air space 82 between each pair of adjacent supports 80. As is best shown in FIG. 5, the outer periphery of each support 80 is corrugated. The spaces 83 which are formed between the outer corrugated surface of each support 80 and the inner surface of the tube 73 constitute air insulating passages which communicate with the spaces 82 on either side of each support within the conduit 70. Thus, the insulated pipe 72 is surrounded by a substantially continuous insulating air cavity throughout the length of the casing 71.

Prefabricated sections 70 of the conduit may be connected in end-to-end relation to form a continuous conduit system by connecting the ends of the pipe 72 of adjacent sections together, providing insulation material around the joints if desired, and finally connecting the ends of adjacent casing sections together. The sections of casing 71 may be connected in the same manner as described above in connection with the embodiment of FIGS. 1–3.

Each of the described embodiments of the invention include a new casing construction which is light and easy to handle. The strength of the casing is derived in part from the corrugated structure engaged between the two plastic tubes. The plastic tubes are light and provide good chemical and corrosion resistance. An added measure of insulation and strength is provided by the foam that fills the spaces between the corrugated structure and the plastic tubes. Because of these features, the casings are durable and easy to handle.

Many modifications and variations of the invention will become apparent to those skilled in the art in the light of the foregoing detailed disclosure. Therefore, it is to be understood that, within the scope of the appended claims, the invention can be practiced otherwise than as specifically shown and described.

What is claimed is:
1. A conduit comprising:
a. a pipe having a first diameter and a first length;
b. a tubular plastic casing having a length less than the length of said pipe and a diameter greater than the diameter of said pipe;
c. said pipe having its ends protruding from the ends of said tubular plastic casing;
d. a tubular plastic band mounted around the circumference of one end of said tubular plastic casing to form a continuous encircling connection with the outer surface of said tubular plastic casing; and
e. sealing means including an annular groove in said tubular plastic band, an O-ring mounted in said groove in coaxial relationship with said one end of said tubular plastic casing, and an axially slidable, tubular sheath around said O-ring, said O-ring forming a peripheral seal between said band and the inner surface of said sheath.

2. A conduit as claimed in claim 1 in which said tubular plastic casing comprises:

f. a first plastic tube, g. a second plastic tube coaxial with said first tube and having a larger diameter than said first tube;

h. corrugated spacing means between said first tube and said second tube; and i. an insulating material filling the spaces between said corrugated means and said tubes.

* * * * *